US009153007B2

(12) United States Patent
Kelly et al.

(10) Patent No.: US 9,153,007 B2
(45) Date of Patent: Oct. 6, 2015

(54) IMAGING SYSTEMS WITH CONFORMAL IMAGE BUFFERS

(75) Inventors: Stuart Kelly, Woodley (GB); Anthony R. Huggett, Basingstoke (GB)

(73) Assignee: Semiconductor Components Industries, LLC, Phoenix, AZ (US)

(*) Notice: Subject to any disclaimer, the term of this patent is extended or adjusted under 35 U.S.C. 154(b) by 461 days.

(21) Appl. No.: 13/444,760

(22) Filed: Apr. 11, 2012

(65) Prior Publication Data

US 2013/0070137 A1 Mar. 21, 2013

Related U.S. Application Data

(60) Provisional application No. 61/537,281, filed on Sep. 21, 2011.

(51) Int. Cl.
*H04N 5/76* (2006.01)
*G06T 1/60* (2006.01)
*H04N 5/357* (2011.01)

(52) U.S. Cl.
CPC ............ *G06T 1/60* (2013.01); *H04N 5/3572* (2013.01)

(58) Field of Classification Search
CPC .................................................. H04N 5/2628
USPC ........................................................ 348/231.1
See application file for complete search history.

(56) References Cited

U.S. PATENT DOCUMENTS

| 5,067,019 A * | 11/1991 | Juday et al. ............... 348/580 |
| 6,970,184 B2 | 11/2005 | Hirama |
| 8,270,763 B2 * | 9/2012 | Huggett ....................... 382/282 |
| 2003/0058368 A1 | 3/2003 | Champion |
| 2008/0307186 A1 * | 12/2008 | Silverstein ................... 711/170 |
| 2009/0066811 A1 * | 3/2009 | Maekawa .................... 348/231.3 |
| 2010/0014770 A1 * | 1/2010 | Huggett et al. .............. 382/260 |
| 2012/0275725 A1 * | 11/2012 | Kelly et al. .................. 382/300 |

FOREIGN PATENT DOCUMENTS

EP 1505539 2/2005

\* cited by examiner

*Primary Examiner* — Gary C Vieaux
(74) *Attorney, Agent, or Firm* — Treyz Law Group; Kendall P. Woodruff

(57) ABSTRACT

Imaging systems may be provided with image sensors for capturing images. An image sensor may include storage and processing circuitry having a conformal image buffer to be used in performing various types of image transformations on captured input images. The storage and processing circuitry may perform the image transformations, in part, by storing a portion of a captured input image in the conformal image buffer. A conformal image buffer may include a buffer for storing input image pixel values specific to various types of image transformations and memory for storing a pixel buffer lookup table. The pixel buffer lookup table may be used by the storage and processing circuitry to determine which input image pixel values should be stored in the conformal image buffer for each type of image transformation and to provide random read access to the stored input image pixel values in the conformal image buffer.

20 Claims, 8 Drawing Sheets

74

| Pixel Buffer Lookup Memory address | Pixel Buffer Lookup | | | |
|---|---|---|---|---|
| | row_valid | x_start | x_end | address offset |
| 0 | 1 | 2 | 7 | 0 |
| 1 | 1 | 2 | 9 | 6 |
| 2 | 1 | 1 | 10 | 14 |
| 3 | 1 | 0 | 11 | 24 |
| 4 | 1 | 1 | 11 | 4 |
| 5 | 1 | 2 | 10 | 15 |
| 6 | 1 | 3 | 8 | 24 |
| 7 | 1 | 4 | 8 | 30 |

FIG. 6 and reading output image pixel data from the conformal image buffer in accordance with an embodiment of the present invention.

IMAGING SYSTEMS WITH CONFORMAL IMAGE BUFFERS

This application claims the benefit of provisional patent application No. 61/537,281, filed Sep. 21, 2011, which is hereby incorporated by reference herein in its entirety.

BACKGROUND

This relates generally to imaging systems, and more particularly, to imaging systems with conformal image buffers.

Electronic devices such as cellular telephones, cameras, and computers often include imaging systems that include digital image sensors for capturing images. Image sensors may be formed having a two-dimensional array of image pixels that convert incident photons (light) into electrical signals. Electronic devices often include displays for displaying captured image data.

In some devices, the imaging system may include a lens that provides a distorted image of a scene to the image sensor. For example, an imaging system with a wide angle lens may provide image of the scene that is warped near the edges of the imaging system's field-of-view. A user of this type of device may desire to display a de-warped version of the distorted image on the display.

In a conventional imaging system, each captured image is stored in an image buffer. Selected portions of the image data are then read from the image buffer when constructing a de-warped output image for display. Other portions of the stored image data are often not used in the output image. Providing sufficient storage for storing an entire input image can therefore be inefficient in compact imaging systems.

It would therefore be desirable to be able to provide improved imaging systems.

BRIEF DESCRIPTION OF THE DRAWINGS

FIG. 6 is a table showing an illustrative configuration of a pixel buffer lookup table for storing information about image data stored in a conformal image buffer in accordance with an embodiment of the present invention.

DETAILED DESCRIPTION

Figure 1:
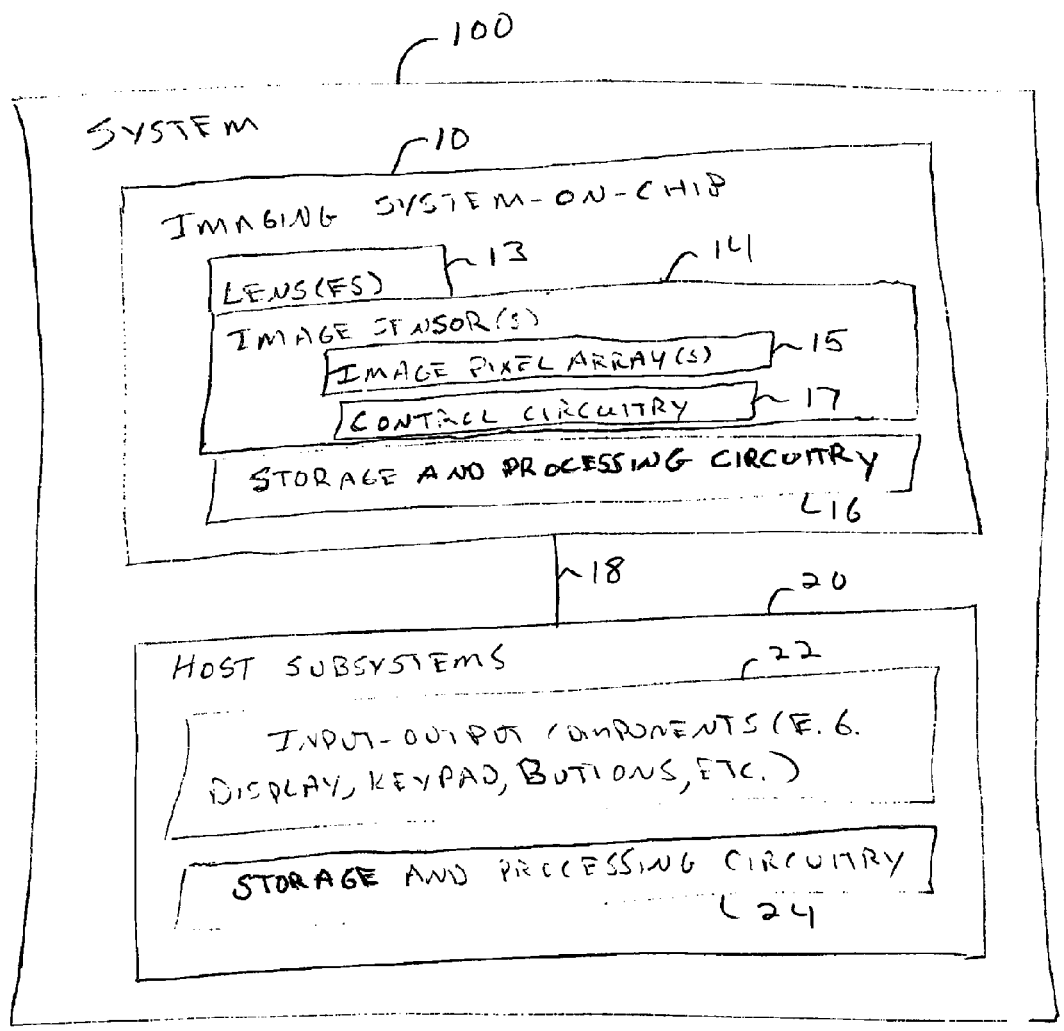
FIG. 1 is a diagram of an illustrative system that includes an imaging system and a host subsystem in accordance with an embodiment of the present invention.

Imaging systems are widely used in electronic devices such as digital cameras, computers, cellular telephones, and other electronic devices. An imaging system may include one or more image sensors that gather incoming light to capture an image, one or more lenses for directing image light onto the image sensors and control circuitry for operating the image sensors. An image sensor may include an array of image pixels. The pixels in the image sensor may include photosensitive elements such as photodiodes that convert the incoming light into electric charge. An image sensor may have any number of pixels (e.g., hundreds or thousands or more). A typical image sensor may, for example, have hundreds, thousands, or millions of pixels (e.g., megapixels).

In some situations, imaging systems may form a portion of a larger system such as a surveillance system or a safety system for a vehicle (e.g., an automobile, a bus, or any other vehicle). In a vehicle safety system such as a rear-view camera for an automobile, images captured by the imaging system may be used by the operator of the vehicle or by the vehicle safety system itself to determine environmental conditions surrounding the vehicle. For example, the system may include a display for displaying some or all of the captured images in order to provide visual information about the environment behind the vehicle to the driver of the vehicle.

Vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle or other object is detected in an image, the vehicle safety system may sometimes operate a warning light, a warning alarm, or may operate active braking, active steering, or other active collision avoidance measures. A vehicle safety system may use continuously captured images from an imaging system to help avoid collisions with objects (e.g., other automobiles or other environmental objects), to help avoid unintended drifting (e.g., crossing lane markers or parking stall edge lines) or to otherwise assist in the safe operation of a vehicle during any normal operation mode of the vehicle.

In some situations, an imaging system such as a rear-view camera may include one or more lenses that provide a wide angle image of a scene to the image sensor. As an example, an imaging system may include a wide-angle "fish-eye" lens that directs light from a wide viewing angle onto an image sensor. The wide-angle lens may generate a distorted (warped) image of the scene. A user of this type of system may desire to display a de-warped portion of the captured image on a display associated with the imaging system. In some situations, a user may desire to display various transformations of the captured image such as a left-rotated image, a right-rotated image or otherwise transformed (and/or de-warped) portion of the captured image. In order to provide this type of image transformation capability without implementing a buffer large enough to store an entire image on the image sensor, an imaging system may include storage and processing circuitry having a conformal image buffer. A conformal image buffer may be configured to store exclusively the portion of the captured image to be used in the transformed output image to be displayed.

FIG. 1 is a diagram of an illustrative system including an imaging system for capturing images. System 100 of FIG. 1 may be a vehicle safety system (e.g., a rear-view camera or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may be an imaging system-on-chip that is implemented on a single silicon image sensor integrated circuit die. Imaging system 10 may include one or more image sensors 14 and one or more associated lenses 13. Lenses 13 in imaging system 10 may, as examples, include a single wide angle lens or M*N individual lenses arranged in an M×N array. Individual image sensors 14 may be arranged as a corresponding single image sensor or a corresponding M×N image sensor array (as examples). The values of M and N may each be equal to or greater than one, may each be equal to or greater than two, may exceed 10, or may have any other suitable values.

Each image sensor in imaging system 10 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens 13 may focus light onto an associated image sensor 14. Image sensor 14 may include one or more arrays of photosensitive elements such as image pixel array(s) 15. Photosensitive elements (image pixels) such as photodiodes may convert the light into electric charge. Image sensor 14 may also include control circuitry 17. Control circuitry 17 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, and other circuitry for operating the image pixels of image pixel array(s) 15 and converting electric charges into digital image data.

Still and video image data from imaging system 10 may be provided to storage and processing circuitry 16. Storage and processing circuitry 16 may include volatile and nonvolatile memory (e.g., random-access memory, flash memory, etc.). Storage and processing circuitry 16 may also include microprocessors, microcontrollers, digital signal processors, application specific integrated circuits, etc.

Image processing circuitry 16 may be used to store image data and perform image processing functions such as data formatting, adjusting white balance and exposure, implementing video image stabilization, face detection, image data write control, image data read control, output image pixel address to input image pixel address transformation, etc. Storage and processing circuitry 16 may include one or more conformal image buffers, a pixel transformation engine, a write control engine, a read control engine, an interpolation engine, a transformation engine, etc. A conformal image buffer may include storage for storing a pixel buffer lookup table and storage for storing pixel data. The storage for storing the pixel buffer lookup table and the storage for storing the pixel data may be formed in a volume that is smaller than an image buffer capable of storing a captured input image or input image frame.

In one suitable arrangement, which is sometimes referred to as a system-on-chip (SOC) arrangement, image sensor(s) 14 and image processing circuitry 16 are implemented on a common semiconductor substrate (e.g., a common silicon image sensor integrated circuit die). If desired, image sensor (s) 14 and image processing circuitry 16 may be formed on separate semiconductor substrates. For example, sensor 14 and processing circuitry 16 may be formed on separate substrates that are stacked.

Imaging system 10 (e.g., processing circuitry 16) may convey acquired image data to host subsystem 20 over path 18. Host subsystem 20 may include a display for displaying image data captured by imaging system-on-chip (SOC) 10. Host subsystem 20 may include processing software for detecting objects in images, detecting motion of objects between image frames, determining distances to objects in images, filtering or otherwise processing images provided by imaging system 10. Host subsystem 20 may include a warning system configured to generate a warning (e.g., a warning light on an automobile dashboard, an audible warning or other warning) in the event objects in captured images are determined to be less than a predetermined distance from the vehicle.

If desired, system 100 may provide a user with numerous high-level functions. In a computer or advanced cellular telephone, for example, a user may be provided with the ability to run user applications. To implement these functions, host subsystem 20 of system 100 may have input-output devices 22 and storage and processing circuitry 24. Input-output devices 22 may include keypads, input-output ports, joysticks, buttons, displays, etc. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

The image pixels of image pixels array(s) 15 may each include a photosensitive element such as photodiode, a positive power supply voltage terminal, a ground voltage terminal and additional circuitry such as reset transistors, source follower transistors, row-select transistors, charge storage nodes, etc. Image pixels in image pixel array(s) 15 may be three-transistor pixels, pin-photodiode pixels with four transistors each, global shutter pixels, time-of-flight pixels, or may have any other suitable photo-conversion architectures.

Figure 2:
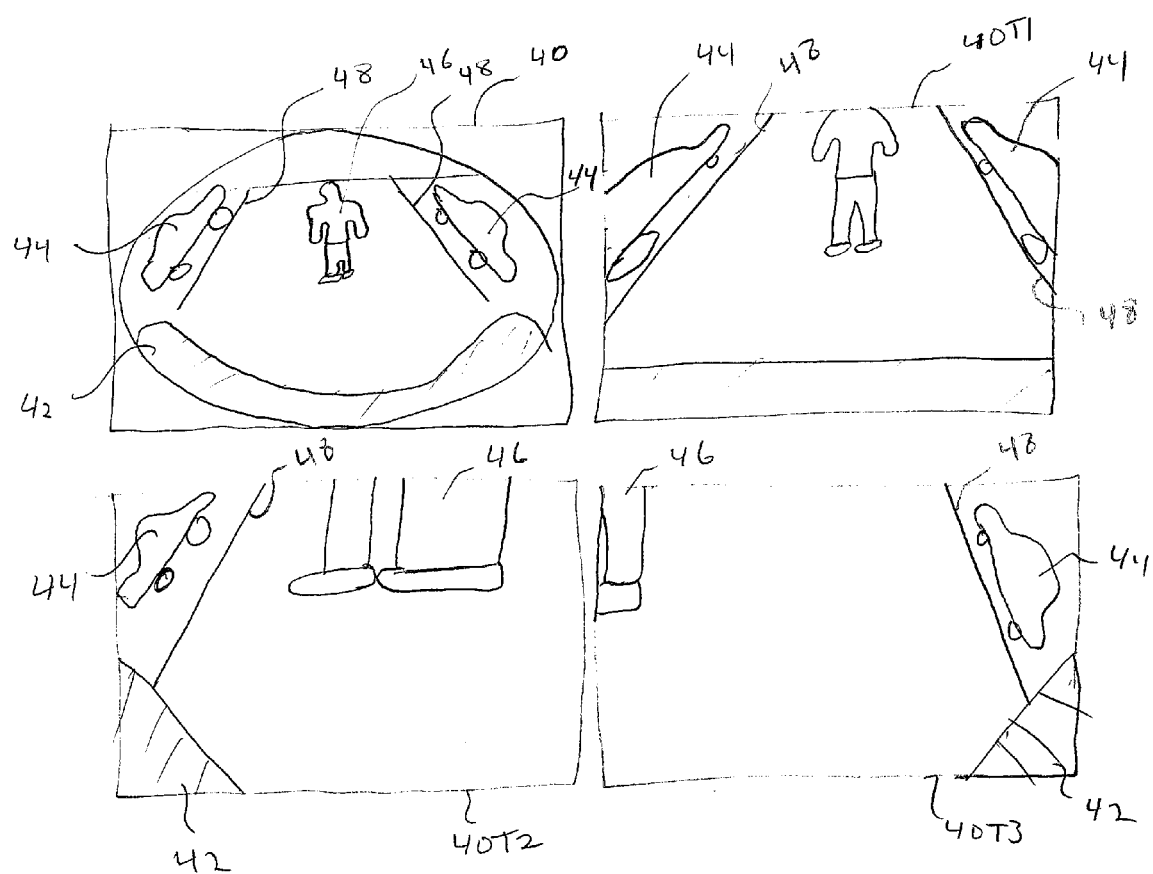
FIG. 2 is a diagram showing illustrative output images that may be generated from various transformations of an input image in accordance with an embodiment of the present invention

FIG. 2 is a diagram showing various transformations of a captured image that may be generated by a system of the type shown in FIG. 1. As shown in FIG. 2, an image such as image 40 of a scene may be transformed to form various transformed output images such as transformed output images 40T1, 40T2, and 40T3. As described above, an imaging system such as imaging system 10 may, if desired, be provided with a wide-angle lens that provides a distorted image of a scene to the image pixel array. In the example of FIG. 2, a wide-angle (sometimes called a "fish-eye") lens may provide a 180 degree view of a scene behind an automobile containing, as examples, a portion of the automobile such as bumper 42, a person such as person 46, road markings such as parking stall marker lines 48, and other vehicles such as vehicles 44 parked in adjacent parking stalls.

During operation of a system such as system 100, an image such as captured image 40 may be displayed on a display associated with system 100. Image 40 may include a wide-angle view of the scene to an operator of system 100. In some situations, the operator may desire to view an undistorted image of a portion of the scene in image 40 such as de-warped output image 40T1. In other situations, the operator may desire to view a portion of the scene in image 40 in a particular direction such as left-view image 40T2 or right-view image 40T3. Left view image 40T2 and right view image 40T3 are examples of transformed images that may be generated by performing image transformations on an image such as image 40. Output images such as de-warped output image 40T1, left-view image 40T2, right-view image 40T3 or any other transformed version of an image such as image 40 may be generated and displayed by a system of the type shown in FIG. 1 by performing image transformations (e.g., de-warping transformations, perspective adjustment transformations, and rotations in two or three dimensions) using a conformal image buffer. The example images of FIG. 2 are merely illustrative. If desired, a system of the type shown in FIG. 1 may be used to generate any type of transformed output images from any type of captured, stored or otherwise received input images.

Figure 3:
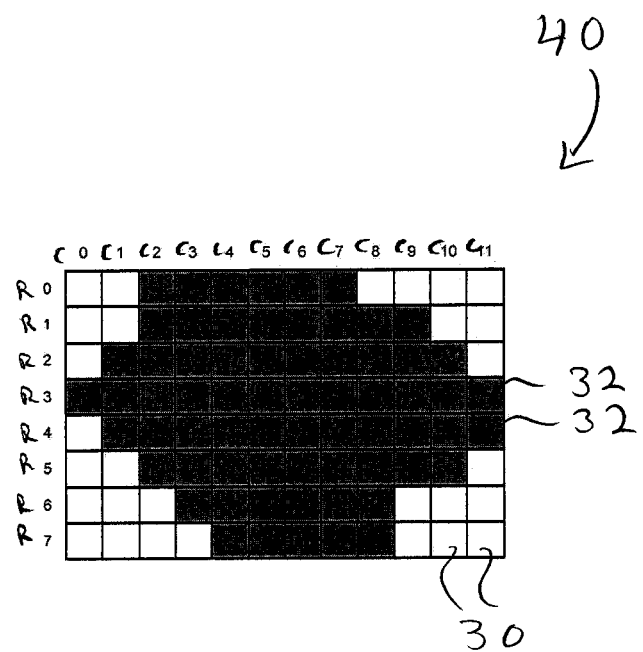
FIG. 3 is diagram showing how an illustrative subset of image pixels in an input image may be used for generating a transformed output image in accordance with an embodiment of the present invention.

For a given type of image transformation (e.g., for each particular type of output image to be generated from a given input image), only a portion of each input image may be used. As shown in FIG. 3, an input image such as image 40 may include rows (e.g., rows R0-R7) and columns (e.g., columns C0-C11) of input image pixel values 30. However, only a subset (e.g., shaded input image pixel values 32) of input image pixel values 30 may be used for a particular image transformation. As an example, shaded input image pixel values 32 of FIG. 3 may be used to generate output image pixel values for a de-warped output image such as image 40T1 of FIG. 2. A different subset of input image pixel values 30 may be selected and used to generate a different output image (e.g., by performing a different transformation using the different subset of input image pixel values) from an input image. Imaging SOC 10 may include a conformal image buffer configured to store only the input image data required for generating a particular type of output image associated with a particular type of image transformation. The conformal image buffer may be configurable during operation of system 10 for storing various particular subsets of input image pixel values 30 associated with various selected transformations.

Figure 4:
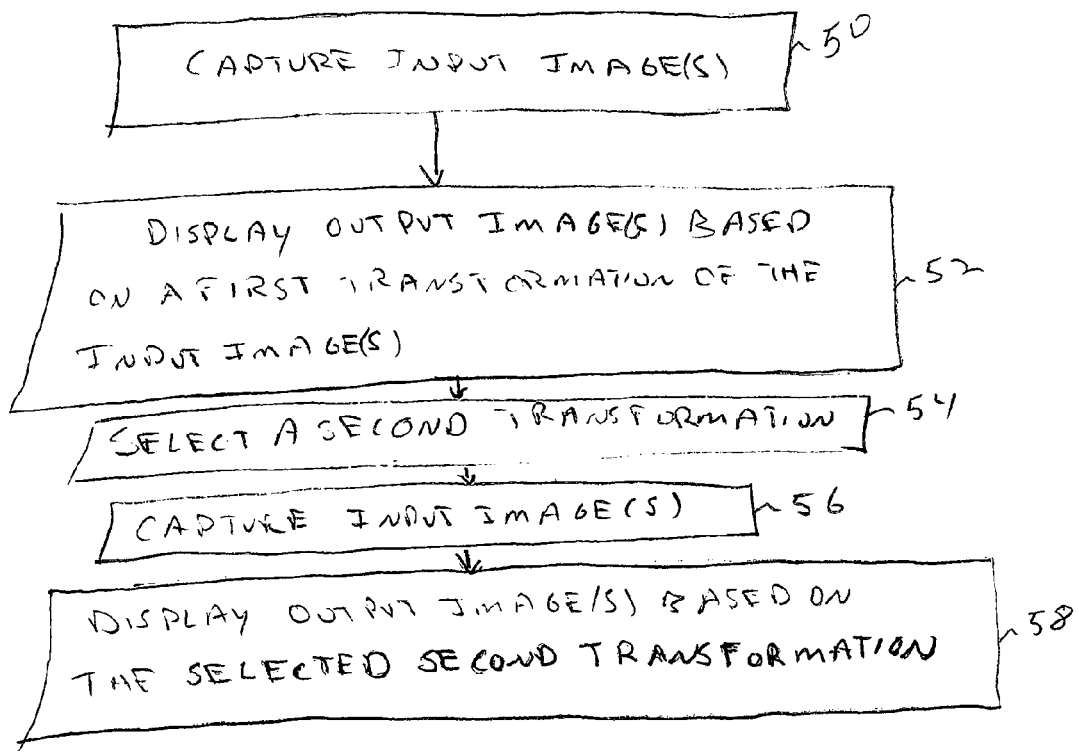
FIG. 4 is a flowchart of illustrative steps that may be used in displaying output images that are transformations input images in accordance with an embodiment of the present invention.

Illustrative steps that may be used in capturing images and displaying transformed output images using a system of the type shown in FIG. 1 are shown in FIG. 4.

At step 50, one or more input images may be captured. Input images may be captured using, for example, imaging SOC 10 of FIG. 1. A single input image may be captured or a stream of input images may be continuously captured and delivered to storage and processing circuitry 16.

At step 52, output images that are based on a first transformation of the captured input images may be displayed using, for example, a display associated with input-output components 22 of FIG. 1. As an example of displaying an output image based on a first transformation of a captured input image, a left-view image such as image 40T2 (e.g., a left-rotated and de-warped portion of a wide-angle input image such as image 40) may be displayed.

At step 54, a second transformation may be selected by, for example, a user of system 100. Selecting a second transformation may include selecting the second transformation directly from a set of available types of transformations or may include selecting a second output view (e.g., a left view, a right view, an enlarged view, or a zoomed view) of an input image that is the result of a corresponding second transformation.

At step 56, one or more additional input images may be captured. Additional input images may include a single input image or a stream of continuously captured input images.

At step 58, output images that are based on the second transformation of the captured input images may be displayed using, for example, a display associated with input-output components 22. As an example of displaying an output image based on a second transformation of a captured input image, a right-view image such as image 40T3 that is a right-rotated and de-warped portion of a wide-angle input image such as image 40 may be displayed. The output images displayed at step 56 may be transformations of the input image(s) captured at step 50 and/or the input image(s) captured at step 56.

Figure 5:
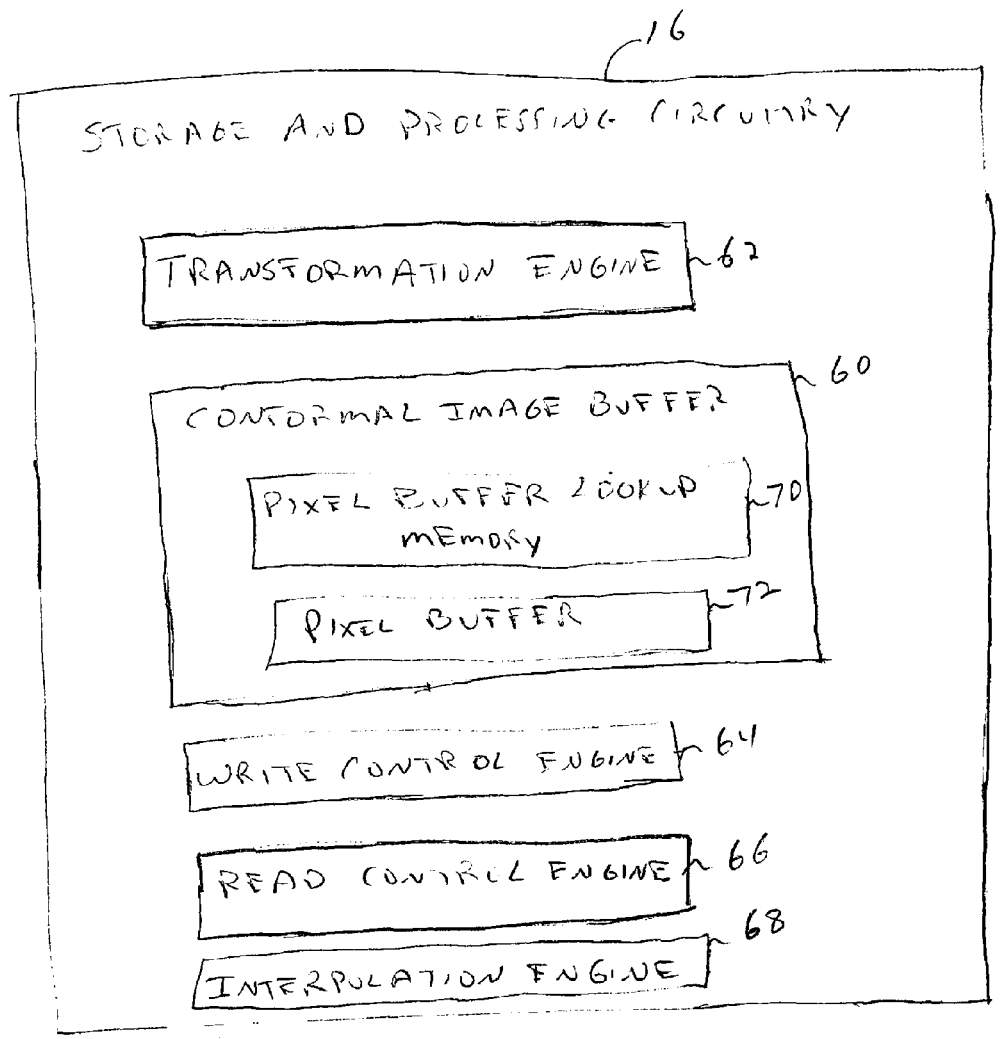
FIG. 5 is a diagram of illustrative storage and processing circuitry having a conformal image buffer that may be used in system of the type shown in FIG. 1 in accordance with an embodiment of the present invention.

A portion of each input image may be temporarily stored in a conformal image buffer before being displayed. As shown in FIG. 5, storage and processing circuitry 16 of imaging system 10 may include an image buffer such as conformal image buffer 60 for temporarily storing selected portions of input images. Conformal image buffer 60 may be used for buffering captured image data to be displayed (e.g., using a display associated with input-output components 22 of FIG. 1). Conformal image buffer 60 may be configurable to store only the captured image data required for a given transformation of a captured input image.

During image capture and display operations, input images may be captured using image pixels array(s) 15. Image data (e.g., input image pixel values) associated with each input image may be temporarily stored in conformal image buffer 60 before being read from conformal image buffer 60 and displayed. For a given transformation (e.g., for each particular type of output image to be displayed), only a corresponding portion of each input image (e.g., shaded input image pixel values 32 of FIG. 3) may be used. Conformal image buffer 60 may therefore be configured to store only that input image data required for an output image associated with a selected transformation.

Conformal image buffer 60 may include storage such as pixel buffer 72 for storing selected input image pixel values and storage such as pixel buffer lookup memory 70 for storing a transformation-specific information (also sometimes referred to as transformation information) such as a pixel buffer lookup table. Pixel buffer 72 and pixel buffer lookup memory 70 may be formed using volatile and/or nonvolatile memory (e.g., random-access memory, flash memory, etc.) Conformal image buffer 60 may be implemented as a separate integrated circuit that is coupled to other portions of imaging SOC 10 or may be implemented on a common integrated circuit die with other portions of imaging system 10. Conformal image buffer 60 may be configured during (or before) operation of system 10 to store input image pixel values for a selected transformation by writing a pixel buffer lookup table that is specific to that selected transformation to memory 70.

Storage and processing circuitry 16 may include processing circuitry for operating conformal image buffer 60 and performing other image transformation operations. In the example of FIG. 5, storage and processing circuitry 16 includes a transformation engine 62 for determining input image pixel addresses associated with each output image pixel address of an output image, write control engine 64 for controlling which input image pixel values are written to which memory address in pixel buffer 72, read control engine 66 for reading output image pixel values from pixel buffer 72 and, if desired, interpolation engine 68 for combining multiple input image pixel values to form a single output image pixel value.

During image capture and display operations, pixel buffer lookup memory 70 may be used to store image transformation information such as pixel buffer lookup table 74 of FIG. 6. Write control engine 64 may use transformation information from pixel buffer lookup table 74 to determine which input image pixel values should be stored in pixel buffer 72 for a particular image transformation. For example, pixel buffer lookup table 74 may include, for each row of input image pixels, data values indicating the first and last pixels in that row of input image pixels to be stored. Pixel buffer lookup table 74 may include, for example, the first column (x_start) and last column (x_end) of each row of input image pixels to be stored. In the example of FIG. 6, pixels in column C2 through column C7 (see, e.g., FIG. 3) of row R0 are stored in pixel buffer 72 (as indicated by the values of x_start, x_end in the first row of table 74).

Transformation information stored in pixel buffer lookup memory 70 may include additional information for providing random read access to all input image pixel values stored in pixel buffer 72. As shown in FIG. 6, pixel buffer lookup table 74 may include, for each row of input image pixels, a memory address offset (e.g., an offset from a known base address) at which that row of image pixels is stored in pixel buffer 72. Read control engine 66 may use pixel buffer lookup table 74 to determine the pixel buffer address at which each input image pixel value is stored. The memory address (pixel buffer address) in pixel buffer 72 at which an input image pixel value may be accessed may be computed by read control engine 66 by using the following equation:

$$\text{Pixel buffer address} = \text{address offset} + \text{column number} - x\_start \quad (1)$$

As an example, the memory address in pixel buffer 72 at which the input image pixel value in row R2 and column C3 (see FIG. 3) of input image 40 may be accessed may be computed by read control engine 66 using the values x_start=1, column number=3, and address offset=14, resulting in a pixel buffer address equal to 16. The input image pixel value in row R2 and column C3 may therefore be found at pixel buffer address equal to 16. In the example of FIG. 6, pixel buffer 72 is 32 pixels deep and the address offsets in pixel buffer lookup table 74 therefore wrap back to zero after each set of 32 pixels. However, this is merely illustrative. Pixel buffer 72 may have any suitable size such that the size of pixel buffer 72 and pixel buffer lookup memory 70 do not exceed the size of a buffer capable of storing an entire captured image frame.

During image capture and display operations, transformation engine 62 may be used to map output image pixel addresses to input image pixel addresses. Each output image pixel value may be determined from one or more input image pixel values. For each particular transformation, a given output image pixel value may be determined from a different input image pixel value or combination of input image pixel values. Transformation engine 62 may be used to transform each output image pixel address to the input image pixel addresses associated with that output image pixel address. Read control engine 66 may use the transformed pixel addresses together with pixel buffer lookup table 74 to compute (e.g., using equation 1) the memory address in pixel buffer 72 at which the input image pixel values associated with the transformed pixel addresses can be accessed.

Each input image pixel value that is read from pixel buffer 72 may be used to form an output image pixel value or may be used in combination with other input image pixel values to form an output image pixel value. In some cases, the transformed pixel address may be a fractional pixel address. In scenarios in which transformed pixel addresses are fractional, multiple input image pixel values may be read and interpolated using, for example, interpolation engine 68.

As show in FIG. 6, transformation information such as pixel buffer lookup table 74 may include other information such as a row valid value that indicates whether any input image pixel values from that row are to be stored. The information stored in table 74 of FIG. 6 is merely illustrative. Any set of transformation information suitable for providing write control engine 64 and read control engine 66 sufficient information for writing and reading only the input image pixel values required for a given image transformation may be used. For example, a pixel buffer lookup table may be provided without a column of end pixels (x_end) for each row. The values of x_end for each row may be computed (e.g., using write control engine 64, read control engine 66, transformation engine 62, other circuitry associated with storage and processing circuitry 16 or other software running on storage and processing circuitry 16) from the values of x_start and address offset for that row. Deriving the values of x_end for each row from stored values of x_start and address offset may help reduce the size of storage 70 for storing pixel buffer lookup table 74.

The size of storage 70 for storing transformation information such as pixel buffer lookup table 74 may also be reduced by reducing the number of rows and/or the number of columns for which transformation information (e.g., x_start, x_end, address offset) is stored).

As an example, a single instance of each of x_start, x_end, and address offset may be stored for each pair of rows of image pixels, each triplet of rows of image pixels, or each set of any number of rows of image pixels. The values of x_start, x_end, and address offset may be the same for each row of image pixels in each set of rows of image pixels for which values are stored. If desired, additional information associated with the number of rows of image pixels in each set of image pixels may also be stored.

As another example, rather than allowing shaded pixels 32 (see, FIG. 3) to be to be selected from any column of image pixels, columns of image pixels may be selected in pairs, in triplets or in sets of columns of image pixels of any size. Selecting, for example, image pixels in sets of two columns may allow the least significant bit of x_start (and x_end) to be eliminated because all values of x_start may only be even values (or all values may be odd values). Selecting, for example, image pixels in sets of four columns may help eliminate the need to store the two least significant bits of x_start (and x_end) thereby reducing the size needed for storage 70.

Figure 7:
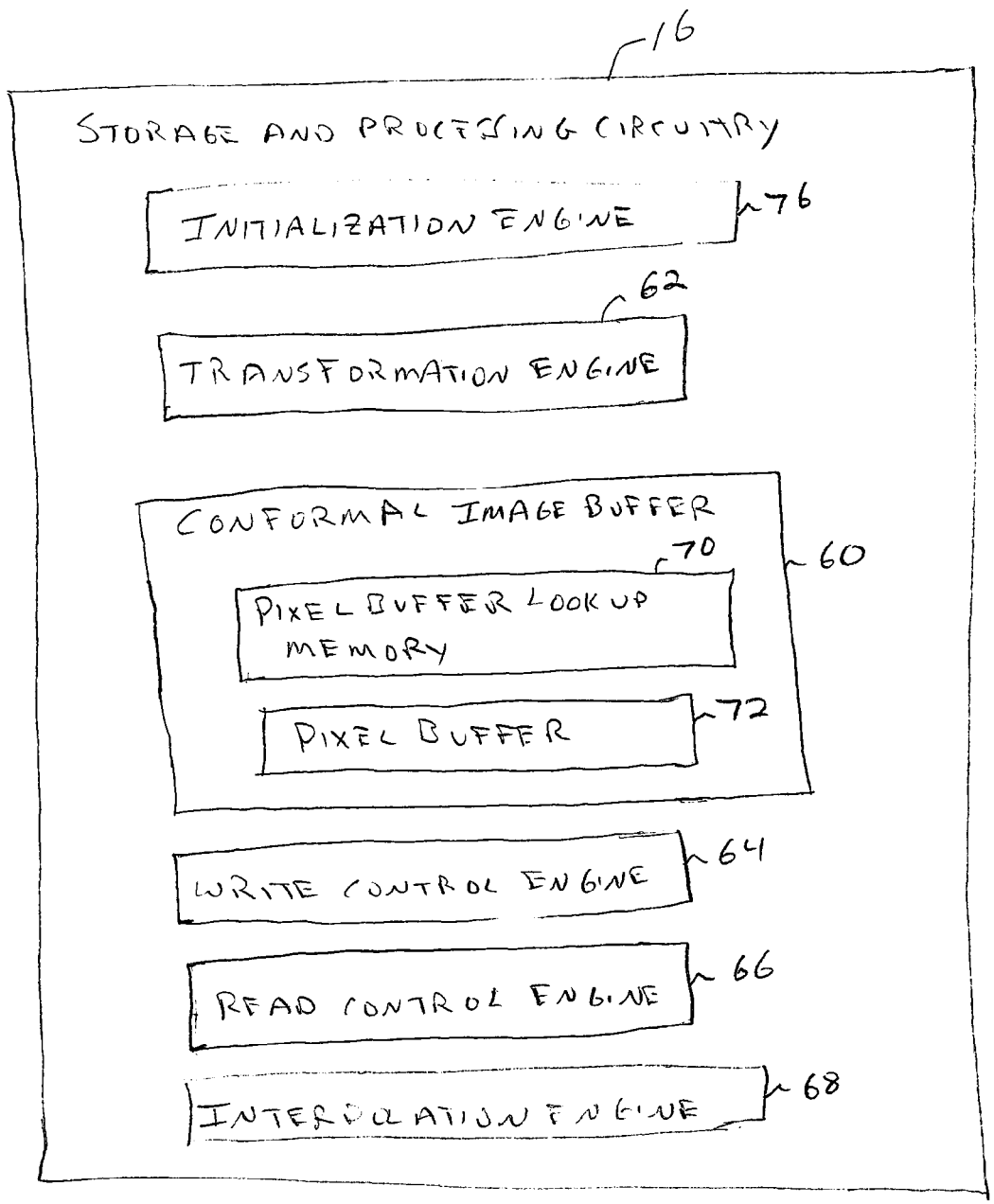
FIG. 7 is a diagram of illustrative storage and processing circuitry having a conformal image buffer with an initialization engine for the conformal image buffer that may be used in system of the type shown in FIG. 1 in accordance with an embodiment of the present invention.

During operation of imaging system 10, conformal image buffer 60 may be initialized (e.g., by providing a new pixel buffer lookup table to pixel buffer lookup memory 70) for each selected type of image transformation (or each selected type of output image). If desired, storage and processing circuitry 24 that is separate from imaging SOC 10 may be used to initialize conformal image buffer 60 (e.g., by providing information for various image pixel buffer lookup tables from firmware or read-only-memory in circuitry 24). However, this is merely illustrative. If desired, storage and processing circuitry 16 of imaging SOC may include an initialization engine such as initialization engine 76 for automatically initializing (auto-initializing) contents of pixel buffer lookup memory 70 as shown in FIG. 7.

Auto-initializing pixel buffer lookup memory 70 for a particular type of image transformation may include generating some or all of the transformed pixel addresses to be used for that transformation and populating a pixel buffer lookup table with transformation information (e.g., x_start, x_end, and address offset values) based on those generated transformed pixel addresses. During auto-initialization operations, read control engine 66 may be temporarily disabled. Auto-initialization operations may be performed upon startup of imaging SOC 10 or may be performed each time a new type of output image (or new type image transformation) is selected during operation of a system such as system 100.

With some image transformations, it may be possible to perform auto-initialization using a subset of the transformed pixel addresses. For example, initialization engine 76 may perform auto-initialization by characterizing the bounds of input pixels required for a given transformation by iterating over only the outer two rows and outer two columns of output image pixel addresses. Performing auto-initialization using a subset of transformed pixel addresses may help reduce the initialization time of pixel buffer lookup table 74 and increase the speed with which a user may switch between desired types of output images. If desired, the speed with which conformal image buffer 60 may be initialized and/or the speed with which input images may be transformed and displayed may also be increased by increasing a logic clock frequency associated with imaging system 10 or host subsystems 20 to a maximum logic clock frequency supported by the chip or by reducing a horizontal blanking interval between rows of image pixel values. If desired, horizontal blanking can be eliminated (i.e., reduced to zero cycles).

Figure 8:
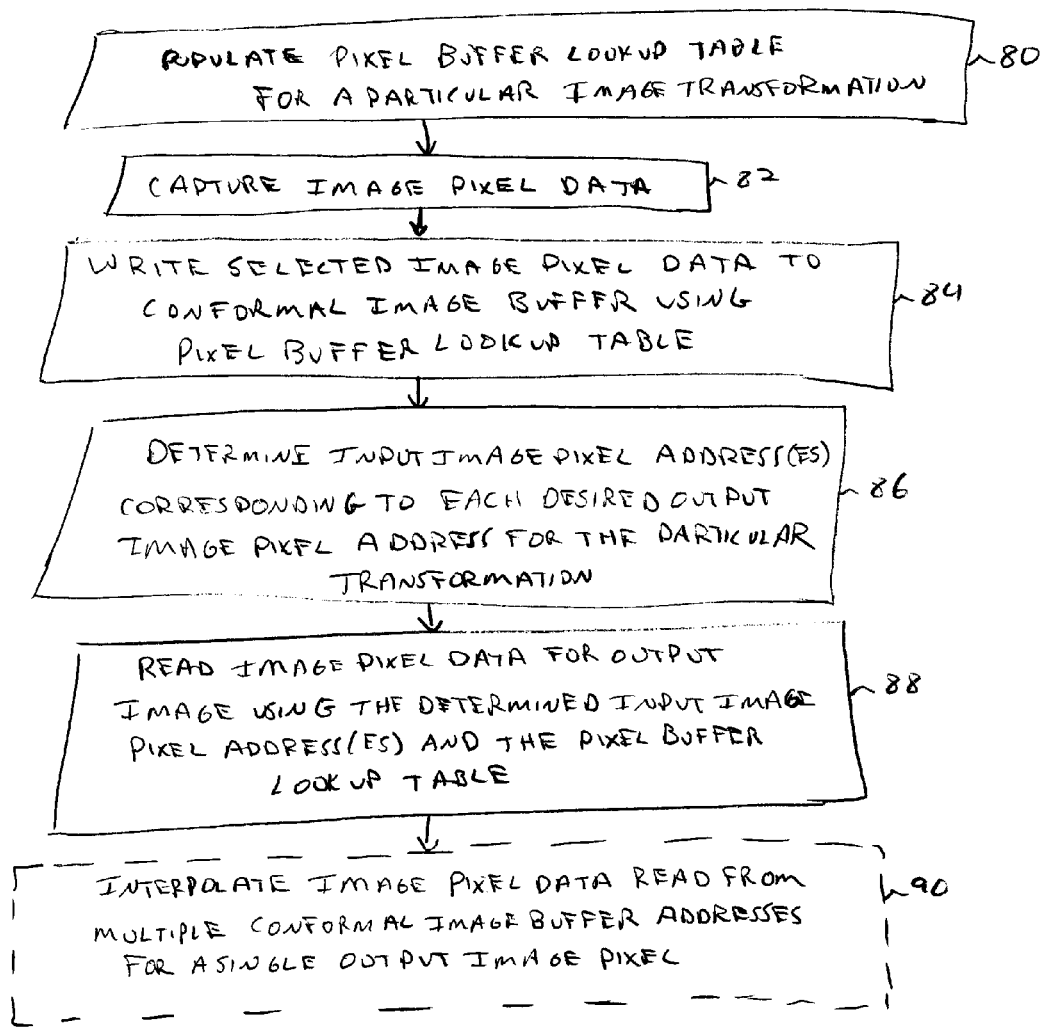
FIG. 8 is a flowchart of illustrative steps that may be used in writing input image pixel data to a conformal image buffer

Illustrative steps that may be used in performing image transformation operations using an imaging system with a conformal image buffer are shown in FIG. 8.

At step 80, a conformal image buffer may be initialized for a particular type of image transformation by populating a pixel buffer lookup table with transformation information associated with that transformation. The pixel buffer lookup table may be populated using on-chip or off-chip circuitry and may include transformation information such as pixel start addresses, pixel end addresses, and memory address offsets.

At step 82, image pixel data such as image pixel values associated with input images may be captured.

At step 84, write control circuitry such as write control engine 64 may be used to write selected input image pixel data to a conformal image buffer using the populated pixel buffer lookup table.

At step 86, transformed pixel addresses may be determined for each output image pixel address of a desired output image. The transformed pixel addresses for each output pixel address may be one or more input image pixel addresses corresponding to each desired output image pixel address for the particular image transformation.

At step 88, image pixel data such as input image pixel values associated with each transformed pixel address may be read from the conformal image buffer using the determined transformed image pixel addresses and the pixel buffer lookup table as described above in connection with, for example, FIGS. 5 and 7.

At optional step 90, for a fractional transformed pixel address, image pixel data such as input image pixel values from multiple input image pixel addresses may be read from multiple conformal image buffer memory addresses and interpolated to form an output image pixel value for the fractional transformed pixel address.

Various embodiments have been described illustrating an imaging and display system (see, e.g., system 100 of FIG. 1) including an imaging system and host subsystems. An imaging system may include one or more image sensors for capturing images. Each image sensor may include an array of image pixels formed on a semiconductor substrate. Each image pixel may include one or more photosensitive elements configured to convert incoming light into electric charges. Each image sensor may include storage and processing circuitry having a conformal image buffer formed on the semiconductor substrate. The host subsystems may include a display for displaying captured images and/or transformations of captured images.

The storage and processing circuitry may include processing circuitry for performing image transformation operations on captured images. Image transformation operations may include de-warping operations, rotation operations, or other transformation operations. The processing circuitry may include a transformation engine for determining input image pixel addresses associated with each output image pixel address of an output image, a write control engine for controlling which input image pixel values are written to which memory address (buffer address) in the conformal image buffer, a read control engine for reading image pixel values from the conformal image buffer and, if desired, an interpolation engine for combining multiple input image pixel values to form a single output image pixel value.

During operation, the conformal image buffer may be initialized for each type of image transformation to be performed. The conformal image buffer may be initialized prior to image capture and display operations or during image capture and display operations. Initializing the conformal image buffer may include populating a pixel buffer lookup table. The pixel buffer lookup table may be used by the write control engine to determine which image pixel values of a captured image are to be stored in the conformal image buffer. The pixel buffer lookup table may be used by the read control engine to determine a pixel buffer address at which a particular input image pixel value is stored. The transformation engine may be used to generate transformed pixel addresses. The transformed pixel addresses may be input image pixel addresses that correspond to a particular output image pixel address for a particular type of transformation.

During image transformation operations (following initialization of the conformal image buffer), image data may be captured. A portion of the captured image data may be written to the conformal image buffer. The portion of the captured image data that is written to the conformal image buffer may be determined using the populated pixel buffer lookup table. Output image pixel values may then be determined from the input image pixel values stored in the conformal image buffer. The output image pixel values may be values that are read directly from the conformal image buffer using the populated pixel buffer lookup table or may be values that are read from the conformal image buffer using the populated pixel buffer lookup table and interpolated to form an output image pixel value.

The foregoing is merely illustrative of the principles of this invention which can be practiced in other embodiments.

What is claimed is:

1. An image sensor, comprising:
 an array of image pixels for capturing an image;
 a conformal image buffer comprising:
  a first storage for storing a pixel buffer lookup table; and
  a second storage for storing only a portion of the captured image;
 a write control engine for writing the portion of the captured image to the second storage using the pixel buffer lookup table, wherein the write control engine determines which portion of the captured image to store in the second storage based on a user-selected image transformation; and
a read control engine for reading out the portion of the captured image from the second storage using the pixel buffer lookup table.

2. The image sensor defined in claim 1 wherein the captured image comprises rows of image pixel values and columns of image pixel values, wherein each image pixel value is associated with an image pixel address, and wherein the portion of the captured image comprises selected image pixel values to be used in forming an output image from the captured input image.

3. The image sensor defined in claim 2 wherein the pixel buffer lookup table includes, for each row of image pixel values, a first column number that identifies a first pixel value in that row of image pixels to be used in forming the output image and a second column number identifying a last pixel value in that row of image pixel values to be used in forming the output image.

4. The image sensor defined in claim 3 wherein the pixel buffer lookup table further includes, for each row of image pixel values, an address offset corresponding to a memory address in the second storage at which the selected image pixel values from that row of image pixels is stored.

5. The image sensor defined in claim 2 wherein the output image includes output image pixel values each associated with an output image pixel address, the image sensor further comprising:
a transformation engine for determining image pixel addresses that correspond to each output image pixel addresses.

6. The image sensor defined in claim 5, further comprising:
an interpolation engine for interpolating multiple image pixel values from the second storage to form a selected one of the output image pixel values.

7. The image sensor defined in claim 6 wherein the output image comprises a transformation of the captured input image, the image sensor further comprising:
an initialization engine for populating the pixel buffer lookup table.

8. The image sensor defined in claim 2 wherein the pixel buffer lookup table includes, for each pair of rows of image pixel values, a first column number that identifies a first column of image pixel values in that pair of rows of image pixels to be used in forming the output image and a second column number identifying a last column of image pixel values in that pair of rows of image pixel values to be used in forming the output image.

9. The image sensor defined in claim 8 wherein the pixel buffer lookup table further includes, for each pair of rows of image pixel values, an address offset corresponding to a memory address in the second storage at which the selected image pixel values from that pair of rows of image pixels is stored.

10. A method of transforming an input image having input image pixel values at input image pixel addresses to form an output image having output image pixel values at output image pixel addresses using an imaging system having a conformal image buffer, the method comprising:
with a write control engine, selecting a portion of the input image pixel values to store in the conformal image buffer based on a user-selected image transformation;
writing only the selected portion of the input image pixel values to the conformal image buffer at corresponding buffer addresses;
after writing the selected portion of the input image pixel values to the conformal image buffer, determining one or more buffer addresses associated with the user-selected image transformation of each output image pixel address;
for each output image pixel address, extracting input image pixel values from the determined one or more buffer addresses in the conformal image buffer; and
generating the output image pixel values from the extracted input image pixel values.

11. The method defined in claim 10 wherein the imaging system includes a transformation engine and wherein determining the one or more buffer addresses associated with a transformation of each output image pixel address comprises:
with the transformation engine, determining one or more input image pixel addresses corresponding to the transformation of each output image pixel address.

12. The method defined in claim 11 wherein the conformal image buffer further comprises a pixel buffer lookup table and wherein determining the one or more buffer addresses associated with the transformation of each output image pixel address further comprises:
determining the one or more buffer addresses associated with the transformation of each output image pixel address using the pixel buffer lookup table and the determined one or more input image pixel addresses corresponding to the transformation of each output image pixel address.

13. The method defined in claim 12, further comprising:
populating the pixel buffer lookup table with transformation information specific to a type of image transformation.

14. The method defined in claim 13, wherein the type of image transformation comprises a de-warping image transformation.

15. The method defined in claim 13, wherein the type of image transformation comprises an image rotation.

16. The method defined in claim 13, wherein the type of image transformation comprises an image rotation and a de-warping image transformation.

17. The method defined in claim 13, further comprising:
populating the pixel buffer lookup table with transformation information specific to an additional type of image transformation that is different from the type of image transformation.

18. An imaging system-on-chip comprising:
a substrate;
an image sensor on the substrate having an array of image pixels for capturing images; and
storage and processing circuitry on the substrate, wherein the storage and processing circuitry comprises:
circuitry that selects a portion of each of the captured images to store based on a type of image transformation selected by a user;
a conformal image buffer comprising a pixel buffer that is configured to store only the selected portion of each of the captured images; and
a transformation engine that is configured to perform the selected type of image transformation in order to transform the captured images into transformed images to be displayed.

19. The imaging system-on-chip defined in claim 18 wherein the transformation engine is configured to determine a portion of each of the captured images that is to be used for transforming the captured images into the transformed images, and wherein the storage and processing circuitry is configured to transform the captured images into the transformed images to be displayed by storing the determined portion of each of the captured images in the conformal image buffer.

20. The imaging system-on-chip defined in claim 19, wherein the conformal image buffer further comprises:

memory for storing a pixel buffer lookup table, wherein the storage and processing circuitry is configured to use the pixel buffer lookup table to determine the portion of each of the captured images that is to be used for transforming the captured images into the transformed images and to use the pixel buffer lookup table to determine particular memory addresses in the conformal pixel buffer that are used to store particular image pixel values associated with the determined portion of each of the captured images.

* * * * *